US011312200B2

(12) United States Patent
Grodde et al.

(10) Patent No.: US 11,312,200 B2
(45) Date of Patent: Apr. 26, 2022

(54) METHOD AND DEVICE FOR ACTUATING AN ACTUATOR DEVICE, AND ACTUATOR DEVICE

(71) Applicant: ZF Friedrichshafen AG, Friedrichshafen (DE)

(72) Inventors: Benjamin Grodde, Ravensburg (DE); Michael Keckeisen, Meckenbeuren (DE); Andreas Füssl, Kressbronn am Bodensee (DE); Holger Gohmert, Ravensburg (DE); Volker Schulmayer, Oberteuringen (DE); Klaus Haskamp, Dinklage (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 805 days.

(21) Appl. No.: 16/062,649

(22) PCT Filed: Nov. 15, 2016

(86) PCT No.: PCT/EP2016/077643
§ 371 (c)(1),
(2) Date: Oct. 30, 2018

(87) PCT Pub. No.: WO2017/102203
PCT Pub. Date: Jun. 22, 2017

(65) Prior Publication Data
US 2019/0054792 A1    Feb. 21, 2019

(30) Foreign Application Priority Data

Jun. 28, 2016  (DE) ..................... 10 2016 211 644.4

(51) Int. Cl.
*B60G 17/00*    (2006.01)
*B60G 17/0185*    (2006.01)
(Continued)

(52) U.S. Cl.
CPC ..... *B60G 17/0185* (2013.01); *B60G 17/0157* (2013.01); *B60G 21/0555* (2013.01);
(Continued)

(58) Field of Classification Search
None
See application file for complete search history.

(56) References Cited

U.S. PATENT DOCUMENTS

2016/0226256 A1* 8/2016 Falk .................... H02H 7/20

FOREIGN PATENT DOCUMENTS

DE    10 2011 055 626 A1    8/2013
DE    10 2013 209 525 A1    11/2014
(Continued)

OTHER PUBLICATIONS

Machine Translation of German Patent Publication No. DE102013209527 to Zahnradfabrik Friedrichshafen.*
(Continued)

*Primary Examiner* — James M McPherson
(74) *Attorney, Agent, or Firm* — Finch & Maloney, PLLC; Michael J. Bujold; Jay S. Franklin (57) ABSTRACT

A method for actuating an actuator device of a roll stabilizer for a vehicle. The actuator device has a supply line connection for supplying a supply voltage, a converter for supplying an alternating voltage using the supply voltage, and at least two phase lines for supplying the alternating voltage to actuator connections of an actuator which can be operated using the alternating voltage. The method has a step of reading an interruption signal, which indicates an interruption in the supply of the supply voltage or a deviation from the supply voltage at the supply line connection and a step of providing a protection signal at an interface with a protection device using the interruption signal in order to at least partly prevent a generator voltage which is or can be
(Continued)

fed into the phase lines via the actuator connections from being forwarded in response to the protection signal.

12 Claims, 5 Drawing Sheets

(51) Int. Cl.
    *B60G 17/015*     (2006.01)
    *B60G 21/055*     (2006.01)
    *B60L 3/04*     (2006.01)
    *H02H 9/04*     (2006.01)
    *H02H 7/09*     (2006.01)
    *B60R 16/03*     (2006.01)

(52) U.S. Cl.
    CPC .................. *B60L 3/04* (2013.01); *H02H 7/09* (2013.01); *H02H 9/041* (2013.01); *B60G 2202/135* (2013.01); *B60G 2202/42* (2013.01); *B60G 2202/442* (2013.01); *B60G 2600/042* (2013.01); *B60G 2600/08* (2013.01); *B60G 2600/084* (2013.01); *B60R 16/03* (2013.01)

(56) References Cited

FOREIGN PATENT DOCUMENTS

DE     10 2013 209 527 A1     11/2014
EP     1 426 208 A1     6/2004
JP     2007-195331 A     8/2007

OTHER PUBLICATIONS

International Search Report Corresponding to PCT/EP2016/0//643 dated Feb. 2, 2017.
Written Opinion Corresponding to PCT/EP2016/077643 dated Feb. 2, 2017.

* cited by examiner

METHOD AND DEVICE FOR ACTUATING AN ACTUATOR DEVICE, AND ACTUATOR DEVICE

This application is a National Stage completion of PCT/EP2016/077643 filed Nov. 15, 2016, which claims priority from German patent application serial nos. 10 2015 225 809.2 filed Dec. 17, 2015 and 10 2016 211 644.4 filed Jun. 28, 2016.

FIELD OF THE INVENTION

The present invention relates to a method and a device for actuating an actuator unit of a stabilizer bar for a vehicle and to an actuator unit.

BACKGROUND OF THE INVENTION

To stabilize the roll of a vehicle, a roll stabilizer is used to control or influence the swaying of the vehicle body when cornering or driving on uneven terrain.

EP 1 426 208 B1 discloses a split electromechanical motor vehicle stabilizer and a method for roll stabilization in the event of failure or disconnection of the active motor vehicle stabilizer.

SUMMARY OF THE INVENTION

Against this background, the present invention provides an improved method and an improved device for actuating an actuator unit in a roll stabilization system of a vehicle and an improved actuator unit of a roll stabilization system in accordance with the main claims. Advantageous embodiments are presented in the dependent claims and the description below.

If the power supply of an actuator, such as an electric motor, is interrupted, the actuator can act as a generator, To prevent resulting damage, electrical feed lines of the actuator can be interrupted or shorted.

A method for actuating an actuator unit of a roll stabilization system for a vehicle, in particular of a roll stabilizer, comprises a plurality of specific steps. For this purpose, the actuator unit has a supply line port for providing a supply voltage, a converter for providing an AC voltage using the supply voltage and at least two-phase lines for providing AC voltage to the actuator port of an actuator operable by the AC voltage.

The steps are as follows:

Importing an interrupt signal indicating an interruption of a supply of the supply voltage or a deviation from the supply voltage at the supply line port; and Providing a protection signal using the interrupt signal at an interface to protection equipment, which is designed to at least partially prevent a generator voltage that is fed or can be supplied to the phase lines from being transmitted via the actuator port in response to the protection signal.

The actuator may be a motor, in particular an electric motor. For instance, the actuator may be an AC motor or a three-phase motor. The converter may be configured to convert a DC voltage to an AC voltage required to operate the actuator. The power of the actuator can be controlled based on a characteristic of the AC voltage. Thus, the converter can be considered as a control unit for controlling the actuator or be part of such a control unit. For instance, the converter can be designed as an inverter. The converter may comprise a bridge circuit for converting the supply voltage into the AC voltage.

The supply voltage may be a DC voltage provided by an on-board supply system, for example an on-board 48V or 12V supply system of a vehicle. Depending on the different embodiments, two, three or more phase lines may be provided for operating the actuator.

The interruption of the supply voltage shall be understood to denote that no supply voltage is provided to the supply line port. This may be the case, for instance, in the event of an interruption of a supply line connected to the supply line port. The deviation of the supply voltage from the range of values shall be understood to denote a greatly reduced or distinct or excessive exceedance of the supply voltage range at the supply line port. The deviation is determined by a threshold—a defined voltage. For a supply voltage of 48V, a threshold "exceedance" can be, for instance, 60V. Along these lines, a threshold, for instance 40V, can also be set for a greatly reduced supply voltage. If an upper or lower threshold is reached or exceeded, an interrupt signal is displayed. Instead of the word threshold, voltage level may also be used.

The interrupt signal and the protection signal may be analog or digital electrical signals.

The generator voltage may be understood to denote a voltage generated by the actuator and fed into the phase lines when the converter is no longer supplied with the supply voltage and thus no AC voltage for operating the actuator is provided by the converter.

The protection equipment may comprise at least one switch which is connected to at least one line of the actuator unit, for instance to at least one phase line or to a line connected to the supply line port. Alternatively or additionally, the protection equipment may comprise control equipment for actuating such a switch. The protection equipment can be used to interrupt or short-circuit a line transmitting the generator voltage, thereby preventing a further propagation of the generator voltage.

According to one embodiment, the method comprises a step causing a short circuit between the phase lines in response to the protection signal using the protection equipment. For instance, the protection signal may represent a control signal suitable for actuating a short-circuit device, for instance at least one switch, such that the short-circuit device causes the short circuit between the phase lines. The protection signal can also be a data signal suitable for making an actuator unit for actuating a short-circuit device such that the short-circuit device assumes a state in which the actuator unit provides a control signal suitable for actuating a short-circuit device such that the short-circuit device is used to short-circuit the phase lines. Such a short circuit can be used to very quickly decrease the generator voltage.

Additionally or alternatively, the method may include a step causing a short circuit between the supply line port and a reference potential of the actuator unit in response to the protection signal using the protection equipment. In this case, the protection signal can likewise be a corresponding control signal or data signal, which can be used to effectuate the short circuit between the supply line port and the reference potential, for instance a ground potential, directly or indirectly by using a short-circuit device. In this way, transmission of the generator voltage can be implemented using only a single switch connected between the supply line port and the reference potential.

According to one embodiment, the method comprises a step causing an interruption between the phase lines in response to the protection signal using the protection equipment. For instance, the protection signal may represent a control signal that is suitable for opening a switch arranged in at least one of the phase lines. The protection signal can also be a data signal suitable for making an actuator unit for actuating a switch arranged in at least one of the phase lines assume a state in which the actuator unit provides a control signal which is suitable for opening the at least one switch. Interrupting the phase lines can prevent the generator voltage from reaching the converter. As a result, damage to the converter due the generator voltage can be prevented.

In the step of effecting, the short circuit and/or the interruption may be alternately effectuated and canceled. A switching frequency can be chosen such that the transmitted portion of the generator voltage cannot cause any damage to the actuator. Advantageously, the transmitted portion may still be used to determine an amplitude of the generator voltage. As an alternative to a selected or specific, i.e. fixed switching frequency, this can also result from the frequency of the threshold values being undershot or exceeded. In other words, the switching frequency then results from the number of occurrences the defined threshold value is undershot and/or exceeded within a time interval.

Advantageously, the steps of importing and providing can be conducted based on the generator voltage. For instance, appropriate devices for implementing the steps can be supplied with the generator voltage, enabling an autonomous operation.

According to one embodiment, the method comprises a step detecting the interruption of a provision of the supply voltage or a deviation from the supply voltage. In detecting the interruption or deviation, a highly reliable decision can be made as to whether or not the provision of the protection signal and thus causing a short circuit or an interruption within the actuator unit is required by setting lower and upper thresholds, or a voltage level.

For instance, the interruption can be detected by a comparison between a voltage applied to the supply line port and a reference voltage. A suitable choice of the reference voltage, e.g. in the design of the circuit, can be used to avoid a short circuit or an interruption occurring within the actuator unit if the supply voltage range is only slightly exceeded or undershot, which deviation is insufficient to cause a danger to the actuator unit.

In the importing step, the interrupt signal can be imported into a communication bus via an interface. Additionally or alternatively, the protection signal can be provided via an interface to a communication bus in the provision step. In this way, the steps of the method can be implemented in conjunction with a communication bus of the actuator unit, To do so, for instance, a CAN bus can be used.

The invention also relates to a device for actuating an actuator unit of a roll stabilizer, in particular for a vehicle. For this purpose, the actuator unit has a supply line port for providing a supply voltage, a converter for providing an AC voltage using the supply voltage and at least two-phase lines for providing the AC voltage to actuator port of an actuator operable by the AC voltage. The invention is characterized by the following features:

an import device for importing an interrupt signal indicating an interruption of a supply of the supply voltage or a deviation from the supply voltage at the supply line port; and a provision device for providing a protection signal using the interrupt signal at an interface to protection equipment, which is designed to at least partially prevent a generator voltage that is fed or can be supplied to the phase lines from being transmitted via the actuator port in response to the protection signal.

By means of devices of such equipment, the steps of the method can be advantageously implemented. A device may be an electrical device that processes electrical signals, such as sensor signals, and outputs control signals in response thereto. Such devices are also referred to as a control unit. The device may have one or more suitable interfaces, which may be in the form of hardware and/or software. In a hardware embodiment, the interfaces may for instance be part of an integrated circuit in which functions of the device are implemented. The interfaces may also be separate integrated circuits or at least partially consist of discrete components. In a software development, the interfaces may be software modules, which are for instance present on a microcontroller in addition to other software modules.

A roll stabilizer comprising said actuator unit further comprises means for actuating the actuator unit. In this way, the approach described above can advantageously be combined with an actuator unit, for instance for the roll stabilization of a vehicle.

A computer program product having program code which can be stored on a machine-readable carrier such as a semiconductor memory, a hard disk memory (e.g. HD or SSD) or an optical memory and which is used to perform the method according to one of the embodiments described above is also of advantage.

BRIEF DESCRIPTION OF THE DRAWINGS

The invention will be explained in more detail by way of example with reference to the attached drawings. In the drawings.

DETAILED DESCRIPTION OF THE PREFERRED EMBODIMENTS

In the description of preferred embodiments of the present invention below, the same or similar reference numerals are used for the similarly acting elements shown in the various figures, wherein the description of these elements shall not be repeated.

Figure 1:
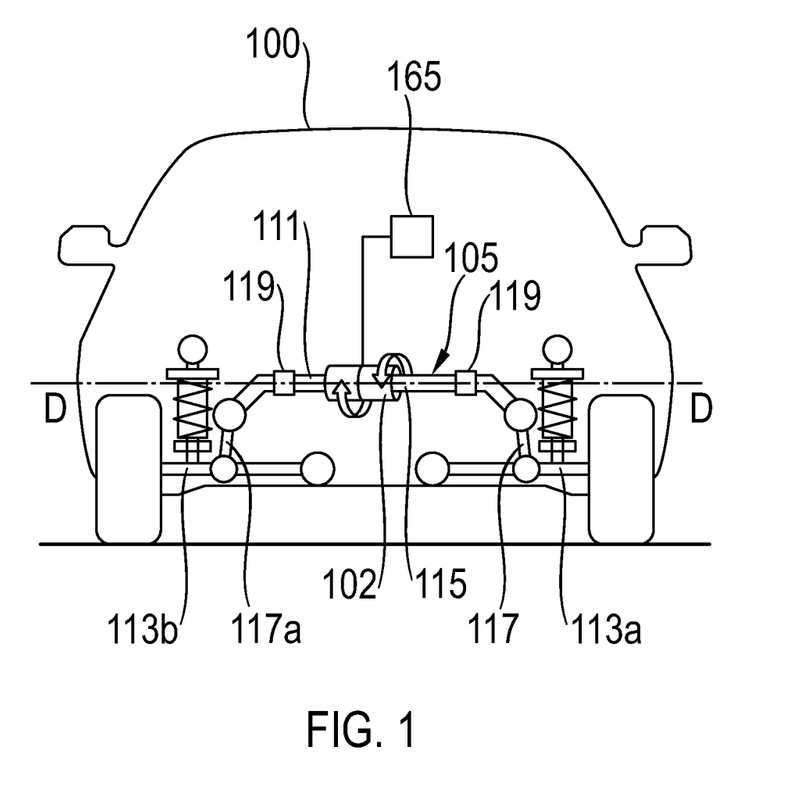
FIG. 1 shows a schematic representation of a vehicle having an actuator unit according to an exemplary embodiment of the present invention.

FIG. 1 shows a schematic representation of a vehicle 100 having a roll stabilizer 105, here called a stabilizer, in accordance with an exemplary embodiment of the present invention. The stabilizer 105 is implemented as a two-part torsion bar having a first stabilizer element 111 and a second stabilizer element 115. For this purpose, one end of the first stabilizer element 111 is connected to a first wheel suspension element 113*a* of the vehicle 100, and one end of the second stabilizer element 115 is connected to a second wheel suspension element 113*b* of the vehicle 100. For instance, the ends of the stabilizer elements 111, 115 are formed, in this case as arms, preferably bent, or bowed, approximately in the direction of travel, which are each connected to the suspension elements 113*a*, 113*b* by means of articulated pendulum supports 117, 117*a*. The suspension elements 113*a*, 113*b* are, for instance, opposing transverse links of the vehicle 100. The stabilizer elements 111, 115 are each rotatably mounted on a chassis or the body of the vehicle 100 about a common axis of rotation D-D by means of a body support 119. In this case, the axis of rotation D-D corresponds, for instance, to a transverse axis of the vehicle 100.

One end of each of the stabilizer elements 111, 115 facing the vehicle center of the vehicle 100 is mechanically coupled to at least one electric motor serving as an actuator 110. The electric motor, not shown, is disposed in the actuator unit 102 and designed to rotate the stabilizer elements 111, 115 in opposite directions about the axis of rotation D-D using a control signal. In this case, the control signal represents, for instance, a signal determined based on a field-oriented control. The suspension elements 113*a*, 113*b* are moved due to the opposing rotation of the stabilizer elements 111, 115, and a swaying of the body, for instance, when cornering can be counteracted.

According to one exemplary embodiment of the present invention, the vehicle 100 is equipped with a device 165, which is connected to the electric motor 135 and configured to provide the control signal.

Figure 2:
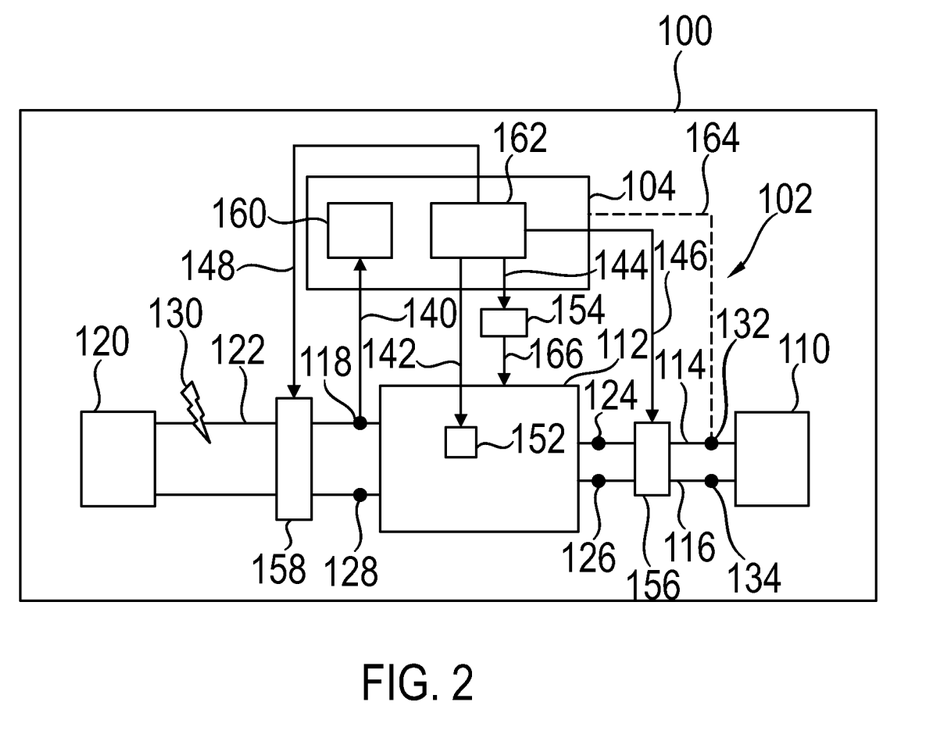
FIG. 2 shows a schematic representation of an actuator unit according to an exemplary embodiment of the present invention.

FIG. 2 shows a schematic representation of a vehicle 100 having an actuator unit according to an exemplary embodiment of the present invention. According to one exemplary embodiment, the actuator unit constitutes a roll stabilizer for the vehicle 100. The actuator unit comprises an actuator unit 102 and a device 104 for actuating the actuator unit 102.

The actuator unit 102 has an actuator 110, which below is also referred to as the motor 110 and which in this case comprises an electric motor 135 and a converter 112. The converter 112 is designed to provide an AC voltage to the actuator 110 via phase lines 114, 116 for operating the actuator 110. The converter 112 has a supply line port 118. A power supply unit 120, for instance an on-board supply system of the vehicle 100, is designed to provide a supply voltage to the supply line port 118 via a supply line 122. The converter 112 is configured to generate the AC voltage using the supply voltage and provide it to the phase lines 114, 116 via the output terminals 124, 126. Another input port 128 of the converter 112 is connected to a ground line according to this exemplary embodiment.

If the supply voltage is interrupted or significantly deviated from its default value (lower or upper threshold or voltage level is reached or exceeded) during operation of the actuator 110, for instance due to an interruption 130 of the supply line 122 or an exceedance 130 of the supply voltage range due to a strong upwards movement of a wheel, which causes the motor of the actuator unit 102 to suddenly rev high, the actuator 110 acts as a generator and feeds a generator voltage into the phase lines 114, 116 via actuator port 132, 134. The generator voltage may damage the actuator unit 102.

The device 104 is designed to completely, or at least partially, prevent the transmission of such a generator voltage fed into the phase lines 114, 116. For this purpose, the device 104 is designed to receive an interrupt signal 140 via an input interface. The interrupt signal 140 is configured to indicate an interruption of a supply or deviation from the supply voltage. The device 104 is designed to generate and provide at least one protection signal 142, 144, 146, 148 based on the interrupt signal 140, which is suitable for actuating the protection equipment 152, 154, 156, 158 in such a way that the generator voltage is at least partially prevented from being transmitted. To import the interrupt signal 140, the device 104 has an import device 160, which is designed to import the interrupt signal 140 and to provide the interrupt signal 140 to a provision device 162 of the device 104. The provision device 162 is designed to generate at least one protection signal 142, 144, 146, 148 based on the interrupt signal 140 and to output it via at least one output interface of the device 104. According to one exemplary embodiment, the import device 160 is further configured to detect the interruption of the supply voltage, for instance by a comparison of the voltage applied to the supply line port 118 to a reference voltage.

According to one exemplary embodiment, the device 104 is coupled to at least one of the actuator terminals 132, 134 via at least one line 164 such that the devices 160, 162 of the devices 104 can be operated via the generator voltage.

According to various exemplary embodiments, the device 104 may be configured to actuate one or more protection 152, 154, 156, 158, of which only one is required. According to one exemplary embodiment, protection equipment 152 is integrated into the converter 112 or is part of the actuator unit 102. According to one exemplary embodiment, protection equipment 154 is implemented as control equipment for providing a control signal 166 generated using the protection signal 144 to actuate the actuator unit 102. In one exemplary embodiment, protection equipment 156 is integrated into the phase lines 114, 116 or coupled to the phase lines 114, 116. According to a further exemplary embodiment, protection equipment 158 is integrated into the supply line 122 or coupled to the supply line 122.

According to one exemplary embodiment, at least one of the protection equipment 152, 154, 156 is designed to effectuate a short circuit between the phase lines 114, 116, actuated by the protection signal 142, 144, 146. Such a short circuit effectively prevents the generator voltage from being transmitted. For this purpose, the protection equipment 152, 154, 156 may be configured to close at least one switch connecting the phase lines 114, 116 in response to the protection signal 142, 144, 146. Alternatively, the protection equipment 152, 156 can also function as such a switch.

According to one exemplary embodiment, at least one of the protection equipment 152, 154, 156 is designed to effectuate an interruption of the phase lines 114, 116 in response to the protection signal 142, 144, 146. Such an interruption effectively prevents the generator voltage from being transmitted. For this purpose, the protection equipment 152, 154, 156 may be configured to open the switches arranged in the phase lines 114, 116 in response to the protection signal 142, 144, 146. Alternatively, the protection equipment 152, 156 can also function as such switches.

According to one exemplary embodiment, the protection equipment 158 is designed to effectuate a short circuit between the supply line port 118 and the further input-side port 128, which may be a ground port, of the converter 112, which is actuated by the protection signal 148. For this purpose, the protection equipment 158 may be configured to close one switch connecting the ports 118, 128 in response to the protection signal 148. Alternatively, the protection equipment 158 may also be designed as such a switch.

According to an exemplary embodiment, the provision device 162 is designed to provide the protection signal 142, 144, 146, 148 in a clocked manner, the protection equipment 152, 154, 156, 158 alternately letting the generator voltage pass and suppressing it. Accordingly, the protection equipment 152, 154, 156, 158 may be configured to alternately effectuate and cancel the corresponding short circuit and/or the corresponding interruption of the phase lines in response to a clocked or non-clocked protection signal 142, 144, 146, 148.

Figure 3:
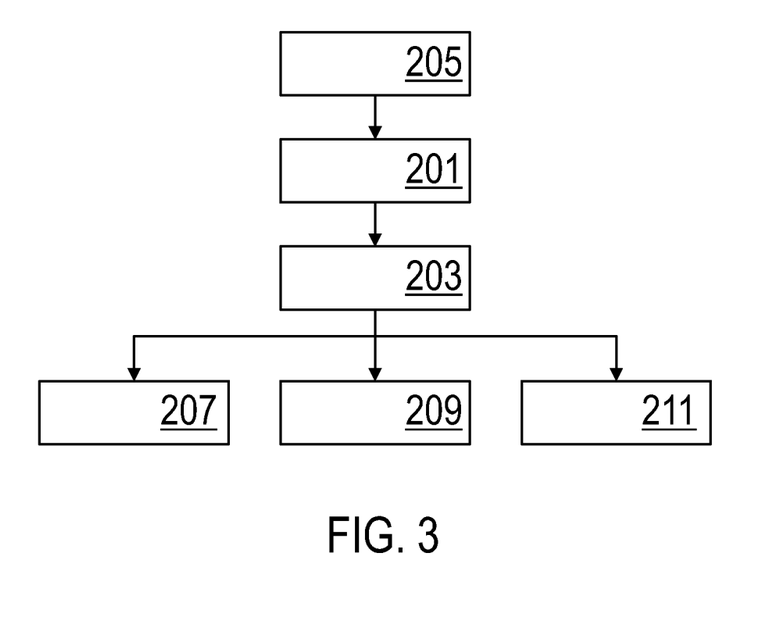
FIG. 3 shows a flow chart of a method for actuating an actuator unit according to an exemplary embodiment of the present invention.

FIG. 3 shows a flow chart of a method for actuating an actuator unit according to an exemplary embodiment of the present invention. The method may be performed using the apparatus described with reference to Hg. 2, for instance. The actuator unit may be the circuit described with reference to FIG. 2.

The method comprises a step 201, in which an interrupt signal is imported, which indicates an interruption or deviation from a supply voltage for a converter of the actuator unit. Furthermore, the method comprises a step 203, in which a protection signal is provided by means of the interrupt signal, via which transmission of a generator voltage possibly jeopardizing the actuator unit is at least partially prevented.

In an optional step 205, the interruption or deviation from the supply voltage is detected. For this purpose, for instance, a comparison is made between the available supply voltage and a reference voltage. The interrupt signal can thus be understood according to an exemplary embodiment as the supply voltage or a signal indicative of the value of the supply voltage.

According to one exemplary embodiment, the method optionally comprises the steps 207, 209, 211, preventing the generator voltage from being transmitted. Thus, in an optional step 207, a short circuit is effectuated between the phase lines of the actuator unit. In an optional step 209, a short circuit is effectuated between the supply line port and a reference potential of the actuator unit. In an optional step 211, an interruption of the phase lines is effectuated. Steps 207, 209, 211 may be performed repeatedly, for instance, to effectuate a clocked short circuit or a clocked interrupt. This means an interruption at intervals, wherein the intervals can have a length of, for instance, 50-200 ms, in particular 100 ms.

Figure 4:
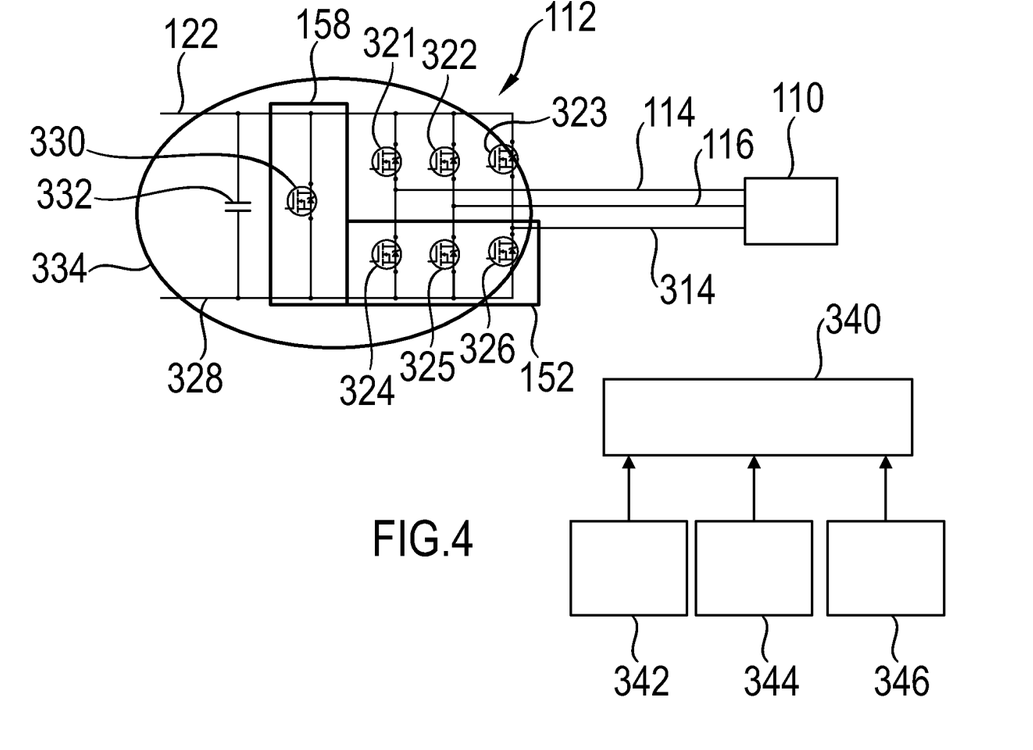
FIG. 4 shows a circuit diagram of an actuator unit according to an exemplary embodiment of the present invention.

FIG. 4 shows a schematic representation of an actuator unit according to an exemplary embodiment of the present invention. This may be an exemplary embodiment of the actuator unit described with reference to FIG. 2.

In accordance with this exemplary embodiment, the converter 112 is configured to provide a three-phase AC voltage to the actuator 110 via three phase lines 114, 116, 314. For instance, the actuator 110 is designed as a three-phase drive. The converter 112 comprises a bridge circuit having six switches 321, 322, 323, 324, 325, 326, which are implemented as transistors in this case. In every case, one port of the transistors 321, 322, 323, which may be implemented as high-side MOSFETs, is connected to the supply line 122. In every case, one port of the transistors 324, 325, 326, which may be implemented as low-side MOSFETs, is connected to a reference potential line 328 of the actuator unit. In every case, a further port of the transistors 321, 324 is connected to the first phase line 114. In every case, a further port of the transistors 322, 325 is connected to the second phase line 116. In every case, a further port of the transistors 323, 326 is connected to the third phase line 314. During normal operation of the actuator unit, a suitable actuation of the transistors 321, 322, 323, 324, 325, 326 can be used to generate a suitable operating voltage for the actuator 110, using the input voltage applied to the converter 112, and provided to the actuator 110 via the phase lines 114, 116, 314.

In accordance with this exemplary embodiment, the protection equipment 152 comprises the three transistors 324, 325, 326 of the bridge circuit. The protection signal described with reference to FIG. 2, or a control signal generated in response to the protection signal, can be used to switch the transistors 324, 325, 326 such that the phase lines 114, 116, 314 are short-circuited.

Alternatively or additionally, the protection equipment 152 comprises the three transistors 321, 322, 323 of the bridge circuit, which can be switched in accordance with the transistors 324, 325, 326 such that the phase lines 114, 116, 314 are short-circuited.

According to this exemplary embodiment, the protection equipment 158 includes an optional further transistor 330, which effectuates a short circuit between the supply line 122 and the reference potential line 328 in the interconnected state. The protection signal described with reference to FIG. 2 or a control signal generated in response to the protection signal, the transistor 330 can be switched such that the lines 122, 128 are short-circuited within the transducer 112 or as close as possible outside of the converter 112.

According to this exemplary embodiment, the actuator unit comprises a DC link capacitor 332, which is connected between the supply line 122 and the reference potential line 328.

In FIG. 4, the actuation 340 of the protection equipment 152, 158 designed as short-circuit devices, is shown purely schematically, which actuation can be triggered via a specific software actuation 342, a higher-level control 344 or a threshold exceedance 346, for instance using a comparator circuit. The functions 340, 342, 344, 346 may be integrated in the device described for the actuation of the actuator unit described with reference to FIG. 2, The comparator circuit is particularly advantageous for detecting the deviation from the supply voltage in the way of monitoring a threshold or a voltage level of the supply voltage.

The converter 112 in conjunction with the DC link capacitor 332 and the transistor 330 may be referred to as the motor drive unit 334. Alternatively, the converter 112 alone may be referred to as motor drive unit 334.

According to an exemplary embodiment, the actuator unit is used in conjunction with an electromechanical roll stabilizer. Thus, the arrangement shown can be used as an intelligent actuation of an actuator 110 in the form of a three-phase drive, when the supply line 122 to the power source is interrupted, in particular for use in an electromechanical roll stabilizer. Herein, the supply line 122 is also referred to as a feed line or power supply line.

In the use of electric roll stabilizers, overvoltages can occur in the component in the regenerative operation when the supply line 122 is lost. Due to this overvoltage, components of the actuation may be irrevocably destroyed. A loss of the power supply can, for instance, be a result of a cable break, defective plug, defective energy storage, etc.

An overvoltage can also, as already mentioned above, occur due to a sudden or impact excitation due to a wheel moving very quickly upwards. The upward movement is transmitted to the respective stabilizer elements 111, 115 by suspension elements 113a, 113b and pendulum supports 117a, 117b. For that reason, a sudden rotational movement acts on the actuator 102, effectuating a sudden revving of the actuator motor—in this way, a sudden strong exceedance of the supply voltage range can occur.

This destruction caused by overvoltage can be prevented by the short-term or clocked short circuit of the motor phases, i.e. a short circuit of the actuator ports at intervals, by a suitable circuit in the electronics of the actuator or an intelligent actuation of the existing motor control 334. This actuation can be implemented by the actuation 342 of the components by means of software, by specifications of a higher-level control 344, e.g. by the vehicle manufacturer, or by exceeding a threshold value 346, resulting in a direct short circuit.

Based on the short circuit method, a safe state of electrical safety can be achieved by not exceeding a maximum DC voltage of 60V according to one exemplary embodiment. By using the short-circuit method, a safe state in terms of functional safety can be achieved by increasing the damping characteristics of the stabilizer, because the actuator 110 in the form of a motor can no longer operate as a generator.

Figure 5:
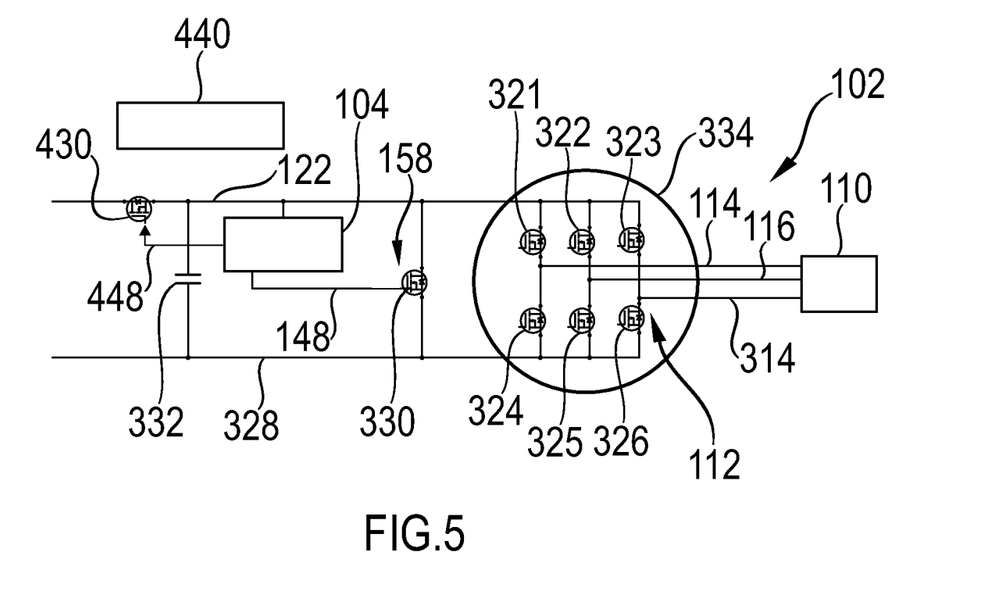
FIG. 5 shows a circuit diagram of an actuator unit according to an exemplary embodiment of the present invention.

FIG. 5 shows a circuit diagram of an actuator unit according to an exemplary embodiment of the present invention. The actuator unit comprises an actuator unit 102 and a device 104 for actuating the actuator unit 102, which may be exemplary embodiments of the devices described with reference to the preceding figures.

The device 104 is connected to the supply line 122 via a line. For instance, to detect an interruption of the supply line 122, the device 104 comprises a measuring device or a comparison circuit, for instance a comparator, according to one exemplary embodiment. Furthermore, the device 104 comprises an actuation for short-circuiting. According to an alternative exemplary embodiment, the device 104 is coupled to a device 440 for detecting a threshold value violation, for instance a comparator circuit, which is designed to evaluate the supply voltage applied to the supply line 122.

According to this exemplary embodiment, the device 104 is designed to provide the protection signal 148 to a control input of the transistor 330 in response to the supply voltage falling below or exceeding a reference value (threshold or voltage level, respectively). Using the protection signal 148, the transistor 330 is switched such that the supply line 122 is short-circuited to the reference potential line 328. In that way, the transistor 330 serves as protection equipment 158.

According to a further exemplary embodiment, a further transistor 430 is integrated into the supply line 122, and the device 104 is designed to provide a signal 448 to a control input of the further transistor 430 in response to the supply voltage falling below or exceeding a reference value (threshold or voltage level) to interrupt the supply line 122. In this way, a short-circuiting of the power supply unit providing the supply voltage via the transistor 330 can be avoided, if an interruption of the supply line 122 elsewhere is canceled.

According to one exemplary embodiment, the supply line 122 is connected to a 48V on-board system of a vehicle (BN48), such that the supply voltage applied to the supply line port of the converter 112 is 48V in standard operation. Due to an interruption of the supply line 122, the supply voltage may drop abruptly, for instance, down to the reference potential applied to the reference potential line 328.

According to one exemplary embodiment, a short-term or a clocked short circuit is implemented by a suitable circuit in the electronics when exceeding or falling below a threshold or voltage level at a corresponding voltage drop or when the supply voltage range is significantly exceeded. Thus, in case of a loss of supply, for instance of the on-board system BN48, according to an exemplary embodiment a further onboard system BN12V, i.e. for instance a 12V on-board system, or the regenerative energy of the actuator 110, ensures a conversion, as described in more detail for instance with reference to FIGS. 5 to 7.

According to the exemplary embodiment described with reference to FIG. 5, a logic circuit is used, for instance the device 440, which monitors the supply line 122 for overvoltage. The device 440 represents, according to one exemplary embodiment, a comparison circuit that can be implemented, for instance, by a comparator circuit, and that can be configured to different threshold values, which may be assigned, for instance, to different reference voltages. If, for instance, the critical threshold of 60V, which is critical for the electrical components and critical in terms of electrical safety, is exceeded, the energy is dissipated by a short circuit within the energy source for the time the threshold is exceeded. According to one exemplary embodiment, this circuit is preferably activated, in particular exclusively, if the supply line 122 has previously been interrupted.

According to the exemplary embodiment shown with reference to FIG. 5, the DC link is short-circuited if a disconnection from the supply 122 has been ascertained.

Additionally or alternatively existing control units of the actuator unit are used to implement a short circuit. For instance, this can be achieved by actuating the bridge driver of the converter 112, which is used to bring the bridge driver into a defined preferred state, as described with reference to FIG. 7, or by a direct actuation of the transistors 324, 325, 326 as described with reference to FIG. 6.

Figure 6:
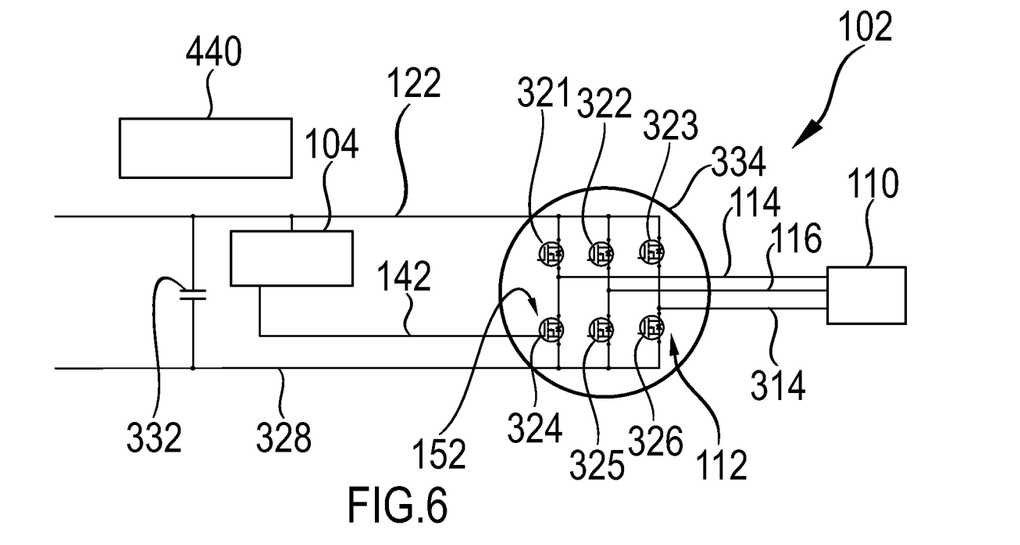
FIG. 6 shows a circuit diagram of an actuator unit according to an exemplary embodiment of the present invention.

FIG. 6 shows a circuit diagram of an actuator unit according to an exemplary embodiment of the present invention. This may be an alternative exemplary embodiment of the actuator unit described with reference to FIG. 5.

According to this exemplary embodiment, the device 104 is configured to provide the protection signal 142 in response to a drop in the supply voltage below a reference value to a control input of at least one of the transistors 324, 325, 326 or to the control inputs of the transistors 324, 325, 326, to switch the transistors 324, 325, 326 to a conducive state, such that the phase lines 114, 116, 314 are short-circuited amongst each other. In that way, the transistors 324, 325, 326 serve as the protection equipment 152.

Figure 7:
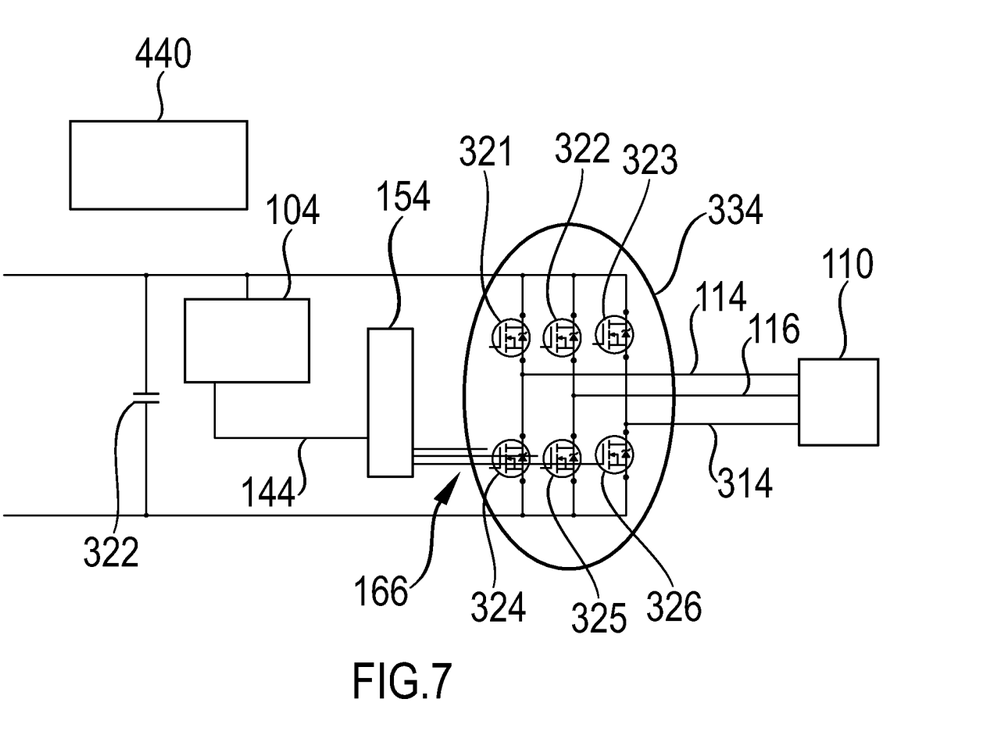
FIG. 7 shows a schematic representation of an actuator unit according to an exemplary embodiment of the present invention.

FIG. 7 shows a circuit diagram of an actuator unit according to an exemplary embodiment of the present invention. This may be an alternative exemplary embodiment of the actuator unit described with reference to FIG. 6.

According to this exemplary embodiment, the device 104 is designed to provide the protection signal 144 to a protection circuit 154 in the form of a control circuit of the converter 112, for instance a bridge driver 154 of the converter 112, in response to the supply voltage dropping below or exceeding a reference value (threshold or voltage level). The protection circuit 154 is configured to provide, in response to the protection signal 144, control signals 166 to the control inputs of the transistors 324, 325, 326, through which the transistors 324, 325, 326 are turned on, short-circuiting the phase lines 114, 116, 314.

Alternatively or additionally, in the case of a corresponding change of the voltage of the supply voltage, a short-term or a docked short-circuit can be implemented by means of an intelligent actuation of the existing motor control 334 in SW or HW. In addition to the B6 bridge 321, 322, 323, 324, 325, 326 and the DC link 332, the motor control 334, which can be designed, for instance, as a control unit, also includes a computing unit (C) (computation of the control algorithms for actuating the motor and actuator) and an electrical circuit that converts the control commands of the arithmetic unit into the control signals of the switching dements of the B6 bridge 321, 322, 323, 324, 325, 326 (bridge driver 154). In the event of the supply voltage of the motor 110 being disconnected from the on-board system of the vehicle, the processing unit and the driver 154 continue to be supplied with the corresponding power for actuation purposes and the processing unit can intervene based on the various options listed below and can initiate a component protection of the B6 bridge 321, 322, 323, 324, 325, 326. This is based on the measurement of the voltage across the DC link 332, as it is required for actuating the motor 110 in all operating conditions. On the basis of the measured voltage and the operating state of the motor 110, the processing unit can, if the DC link voltage is too high, make the bridge driver 154 assume a state in which the motor phases are short-circuited by switching the transistors 324, 325, 326 representing the low-side switch or the transistors 321, 322, 323 representing the high-side switch. The detection of the voltage can be effectuated via the analog detection of the DC link voltage or via the digital detection of a signal representing the threshold. Triggering can be based on a cyclic task or on an event.

If a higher-level control (e.g., vehicle manufacturer specific control) is selected, the short circuit is implemented according to an exemplary embodiment from one of the methods described above. The difference is that the specification of a lower, or no, recuperation is sent on a communication bus as data to the actuator.

Figure 8:
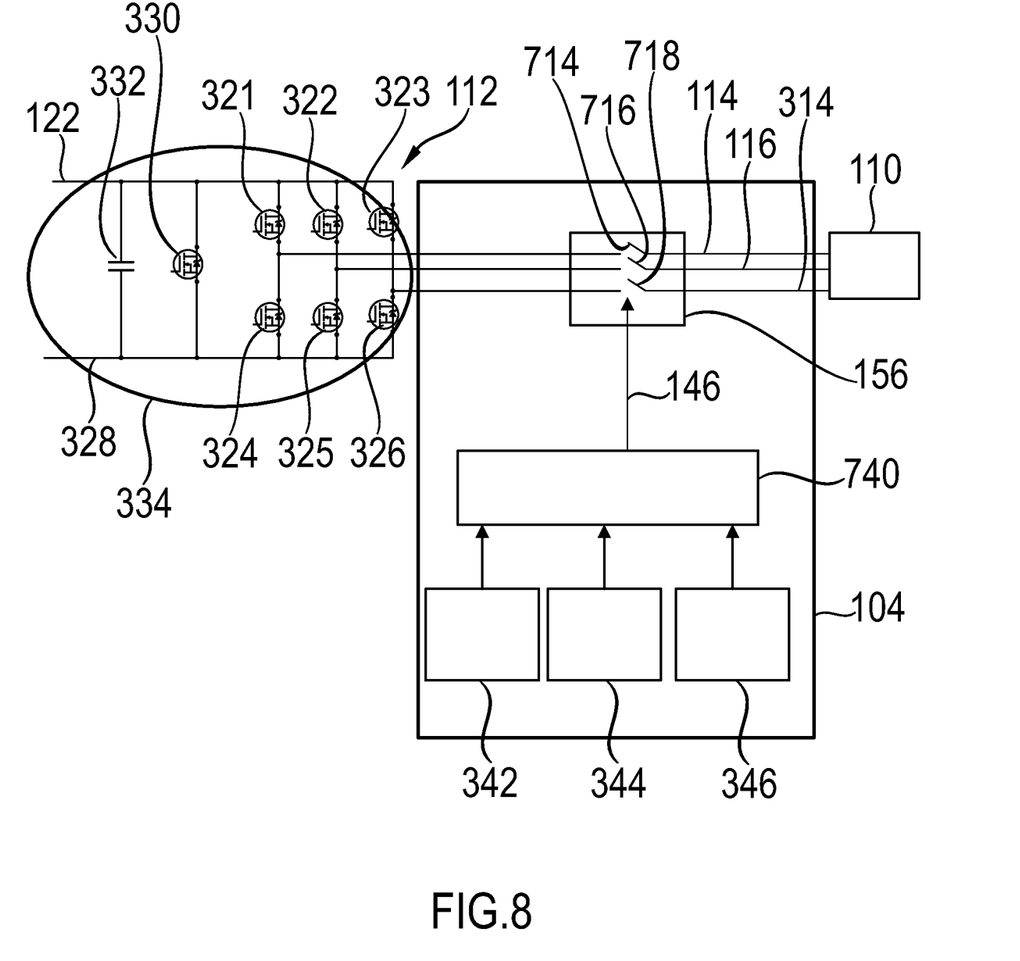
FIG. 8 shows a schematic representation of an actuator unit according to an exemplary embodiment of the present invention.

FIG. 8 shows a schematic representation of an actuator unit according to an exemplary embodiment of the present invention. This may be an exemplary embodiment of the actuator unit described with reference to FIG. 4.

According to this exemplary embodiment, the protection equipment 156 comprises three switches 714, 716, 718 arranged in the phase lines 114, 116, 314. In this case, the switch 714 is arranged in the first phase line 114, the second switch 716 in the second phase line 116 and the third switch 718 in the third phase line 314. Via the protection signal described with reference to FIG. 2, the switches 714, 716, 718 can be switched so that the phase lines 114, 116, 314 are interrupted.

In FIG. 8, an actuation 740 of the protection equipment 156, designed as a phase disconnecting device is shown purely schematically, which actuation can be triggered via a specific software actuation 342, a higher-level control 344 or a threshold exceedance 346. The functions 340, 342, 344, 346 may be integrated in the device described for the actuation of the actuator unit described with reference to FIG. 2. A direction of action of the actuation 740 is represented by the arrow of the protection signal 146.

The arrangement shown, as described with reference to FIG. 4, can be used for actuating an actuator 110 in the form of a three-phase drive, in particular for use in an electromechanical roll stabilizer.

By separating the actuation electronics of the motor control 334 from the motor or actuator 110 by a suitable arrangement for separating the motor phases, this destruction by overvoltage can be prevented. The separation can be implemented through targeted actuation 342 of the components by means of software, by default to a higher-level control 344, e.g. by the customer, or by exceeding a threshold value 346, which leads to a direct actuation of the phase separator, here the switch 714, 716, 718.

By using the phase separator, a safe state in terms of electrical safety can be achieved through not exceeding the maximum DC voltage, for instance 60V. By using the phase separator, the motor 110 can no longer act as a generator.

Another application is a separation of the phase separators in order to prevent feedback from the perspective of the on-board system or to keep the energy balance stable. The use of a phase separator is also useful in many other fields of application, e.g. in gearbox actuation or steering actuation, in particular in rear-wheel steering.

REFERENCE NUMERALS

100 Vehicle
102 Actuator unit
104 Device for actuating the actuator unit
105 Roll stabilizer
110 Actuator, motor
111 First stabilizer element
112 Converter
113a, 113b Wheel suspension elements, links
114 Phase line
115 Second stabilizer element
116 Phase line
117, 117a Pendulum support
118 Supply line port
119 Body support
120 Power supply unit
122 Supply line
124 Output port
126 Output port
128 port on the input side
130 Interruption, exceedance
132 Actuator port
134 Actuator port
140 Interrupt signal
142 Protection signal
144 Protection signal
146 Protection signal
148 Protection signal
152 Protection equipment
154 Protection equipment
156 Protection equipment
158 Protection equipment
160 Import device
162 Provision device
164 Line
165 Device
166 Control signal
201 import step
203 Provision step
205 Detection step
207 Effectuating step
209 Effectuating step
211 Effectuating step
314 Phase line
321 Bridge transistor
322 Bridge transistor
323 Bridge transistor
324 Bridge transistor
325 Bridge transistor
326 Bridge transistor
328 Reference potential line
330 Transistor
332 DC Link capacitor
334 Motor actuation
340 Actuation
342 Software actuation
344 higher-level control 346 Exceedance of threshold value
430 Transistor
440 Device for detecting an exceedance of threshold value
448 Signal
714 Switches
716 Switches
718 Switches
740 Actuation

The invention claimed is:

1. A method of actuating an actuator unit of a roll stabilizer for a vehicle, the actuator unit has a supply line port located in a power supply line for providing a supply voltage which flows along the power supply line from a power supply unit through the supply line port to a converter, the converter providing an AC voltage using the supply voltage, and at least two phase lines for providing the AC voltage from the converter to actuator ports of an actuator, the actuator being arranged downstream from the converter and operable using the AC voltage, and the method comprising:

importing, with an actuating device, an interrupt signal from the supply line port which indicates either an interruption of a provision of or a deviation from the supply voltage at the supply line port; and
    providing, with the actuating device, a protection signal to protection equipment located upstream of the supply line port and downstream of the converter, the actuating device communicating, via an output interface, with the protection equipment, the protection signal being based on the interrupt signal imported by the actuating device, and the protection equipment is designed to at least partially prevent a generator voltage that either is fed or can be supplied from the actuator to the at least two phase lines from being transmitted by way of the actuator ports in response to the protection signal.

2. The method according to claim 1, further comprising a step of effectuating a short circuit, between the at least two phase lines, in response to the protection signal using the protection equipment.

3. The method according to claim 1, further comprising a step of effectuating a short circuit, between the supply line port and a reference potential of the actuator unit, in response to the protection signal using the protection equipment located upstream of the supply line port.

4. The method according to claim 1, further comprising a step effectuating an interruption, between the at least two phase lines, in response to the protection signal using the protection equipment located upstream of the supply line port.

5. The method according to claim 2, further comprising, during the effectuating step, at least one of the short circuit and the interruption are alternately effectuated and canceled.

6. The method according to claim 1, further comprising the importing and the providing steps are performed using the generator voltage.

7. The method according to claim 1, further comprising a detecting step for the interruption of a provision of the supply voltage or a deviation from the supply voltage from between the power supply unit and the converter.

8. The method according to claim 7, further comprising detecting the interruption based on a comparison of a voltage applied to the supply line port and a reference voltage.

9. The method according to claim 1, further comprising at least one of importing the interrupt signal in the import step, by way of an interface to a communication bus, and providing the protection signal to the communication bus, by way of an interface in the provision step.

10. A device for actuating an actuator unit of a roll stabilizer for a vehicle, the actuator unit having a supply line port located in a power supply line through which a supply voltage flows along the power supply line from a power supply unit, a converter providing an AC voltage using the supply voltage, and at least two phase lines providing the AC voltage to actuator ports of an actuator which is located downstream of the converter and operable using the AC voltage, the device comprises:

an import device of an actuating device for importing an interrupt signal from the supply line port which indicates an interruption of a provision of the supply voltage at the supply line port; and
    a provision device of the actuating device for providing a protection signal based on the interrupt signal to protection equipment located upstream of the supply line port and downstream of the converter, the provision device communicating, via an output interface, with the protection equipment, the protection equipment is designed to at least partially prevent a generator voltage generated by the actuator that either is fed or can be supplied to the at least two phase lines from being transmitted upstream by way of the actuator ports in response to the protection signal.

11. An actuator unit in a roll stabilizer having a supply line port located in a power supply line through which a supply voltage flows along the power supply line from a power supply unit, and a converter for providing an AC voltage using the supply voltage and at least two phase lines for providing the AC voltage to actuator ports of an actuator which is located downstream of the converter and that is operable using the AC voltage, and the actuator unit comprises an actuating device for actuating the actuator unit, the actuating device comprising:

an import device for importing an interrupt signal from the supply line port which indicates an interruption of a provision of the supply voltage at the supply line port; and
    a provision device for providing a protection signal based on the interrupt signal to protection equipment located upstream of the supply line port and downstream of the converter, the provision device communicating, via an output interface, with the protection equipment, the protection equipment is designed to at least partially prevent a generator voltage generated by the actuator that either is fed or can be supplied to the at least two phase lines from being transmitted by way of the actuator ports in response to the protection signal.

12. A computer program product with program code, which is stored on a machine-readable medium, for performing the method according to claim 1, when the program is executed on a device.

* * * * *